United States Patent
Sol et al.

(10) Patent No.: US 7,761,924 B2
(45) Date of Patent: Jul. 20, 2010

(54) MANIPULATION OF INFORMATION EMBEDDED IN CONTENT

(75) Inventors: Alisson A. S. Sol, Redmond, WA (US); Alexandru D. Burst, Redmond, WA (US); David Koronthaly, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/172,757

(22) Filed: Jun. 30, 2005

(65) Prior Publication Data

US 2006/0095285 A1    May 4, 2006

Related U.S. Application Data

(60) Provisional application No. 60/583,985, filed on Jun. 30, 2004.

(51) Int. Cl.
*G06Q 99/00* (2006.01)
(52) U.S. Cl. ....................................................... 726/27
(58) Field of Classification Search ................... 726/27; 705/1
See application file for complete search history.

(56) References Cited

U.S. PATENT DOCUMENTS

| | | | |
|---|---|---|---|
| 2005/0005079 A1* | 1/2005 | Boudou et al. | 711/156 |
| 2005/0138057 A1* | 6/2005 | Bender et al. | 707/102 |
| 2005/0257139 A1 | 11/2005 | Burns et al. | |
| 2005/0268219 A1 | 12/2005 | Roma i Dalfo | |
| 2006/0265359 A1 | 11/2006 | Burst et al. | |

OTHER PUBLICATIONS

Microsoft Corporation "Office Information Bridge Framework 1.5 Solution Development Guide", © 2005 Microsoft Corporation.
Microsoft Corporation "Technical Overview of Information Bridge Framework", May 2004.
Microsoft Corporation "Overview of Office 2003 Developer Tools and Programs", Sep. 2004.

* cited by examiner

*Primary Examiner*—Kambiz Zand
*Assistant Examiner*—Aubrey H Wyszynski

(57) ABSTRACT

System and method involving the manipulation of information that may be embedded in content in a variety of ways and for a number of reasons, such as for protecting the embedded content from unauthorized users. Additionally, application program interfaces are disclosed that expose one or more methods relating to encoding data before the data is embedded in some content. Conversely, a method for decoding data that has been embedded in content is provided.

15 Claims, 8 Drawing Sheets

MANIPULATION OF INFORMATION EMBEDDED IN CONTENT

PRIORITY CLAIM

This application claims benefit of priority under 35 U.S.C. §119(e) based on U.S. Provisional Patent Application No. 60/583,985 filed on Jun. 30, 2004, which is incorporated by reference herein in its entirety.

TECHNICAL FIELD

The disclosed subject matter may relate generally to data processing and, more particularly, may relate to one or more software architecture implementations that may involve manipulating data embedded in content to perform a number of tasks involving the embedded data.

COPYRIGHT NOTICE

A portion of the disclosure of this patent document may include and/or may refer to material which may or may not be subject to copyright protection. The copyright owner has no objection to the facsimile reproduction of the patent document or the patent disclosure as it may appear in the United States Patent and Trademark Office patent files and/or records, but otherwise reserves all copyright rights whatsoever.

BACKGROUND

Information workers are people who create, use, or manipulate information. These workers may often employ multiple software host applications to complete their tasks. As an example, information workers may use office productivity software, such as MICROSOFT® OFFICE® host applications, to input, modify, or format information. This information may be provided by and/or to one or more other host applications, such as line of business ("LOB") host applications.

LOB host applications may sometimes have client-side components that may operate on a client computing device and server-side components that may operate on a server computing device. The server-side components may typically employ an associated data store for storing data that may be provided to the information workers. Further, server-side components of such LOB host applications may employ relational databases and data warehouses for maintaining business related data. To access data made available by the LOB applications, information workers may find themselves switching back and forth between their office productivity software and the LOB host applications.

SUMMARY

The following presents a simplified summary of the subject matter disclosed in further detail herein to provide a basic understanding to the reader. This summary is not an exhaustive or limiting overview of the disclosed subject matter, and is not provided for identifying key and/or critical elements of the subject matter or delineating the scope of the claimed subject matter. Thus, the scope of the claimed subject matter should not be limited in any way by this summary. Its sole purpose is to present some of the concepts in a simplified form as an introduction to the more detailed description that is presented later.

As such, the disclosed technology will be described throughout this disclosure in the context of involving the manipulation of information that may be embedded in content in a variety of ways and for a number of reasons, such as for protecting the embedded content from unauthorized users, for example. However, it should be appreciated that the concepts disclosed herein should not be construed as being limited to any particular applications or implementation environments.

Information may be embedded in content for a number of reasons. When information is embedded into content, there may be a risk that the information may be confidential and may inadvertently become exposed to unauthorized viewers. Examples of such embedded information that may inadvertently become exposed may include credit card numbers, names and street addresses, for example.

Generally, the disclosed technology proposes replacing the actual information that might otherwise be embedded in content with one or more corresponding references to the replaced information that may be encoded in some manner to prevent unauthorized users from being able to access the potentially confidential information. The disclosed technology may involve a number of modules and components, such as one or more tag modules that may be included in content for identifying or otherwise marking one or more portions of the content. Further, the tag modules may comprise context information that may relate to describing one or more characteristics of the portion of the content and/or one or more actions to be performed in relation to the content.

Furthermore, one or more reference components may also be included in the content in addition to the tag modules. The reference components may describe a number of details relating to the information that may have been replaced by the one or more references. These reference components may provide sufficient information that may enable one or more authorized users to access the referenced information. Many of the attendant features will become more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps that may be performed to provide an implementation of the example. However, the same or equivalent functions and sequences may be accomplished by different examples.

Generally, additional information describing some content may be associated with the content in a number of ways, including being embedded within the content itself or otherwise being associated with the content in some other fashion (hereinafter simply referred to for convenience as being "embedded" and variations thereof). Sometimes, embedded information may represent "sensitive" information. Sensitive information may include any information for which there may be a desire to restrict access, for instance. An example of sensitive information may include an employee's personal information, such as their yearly salary, or any other type of confidential information (e.g., social security number).

Figure 1:
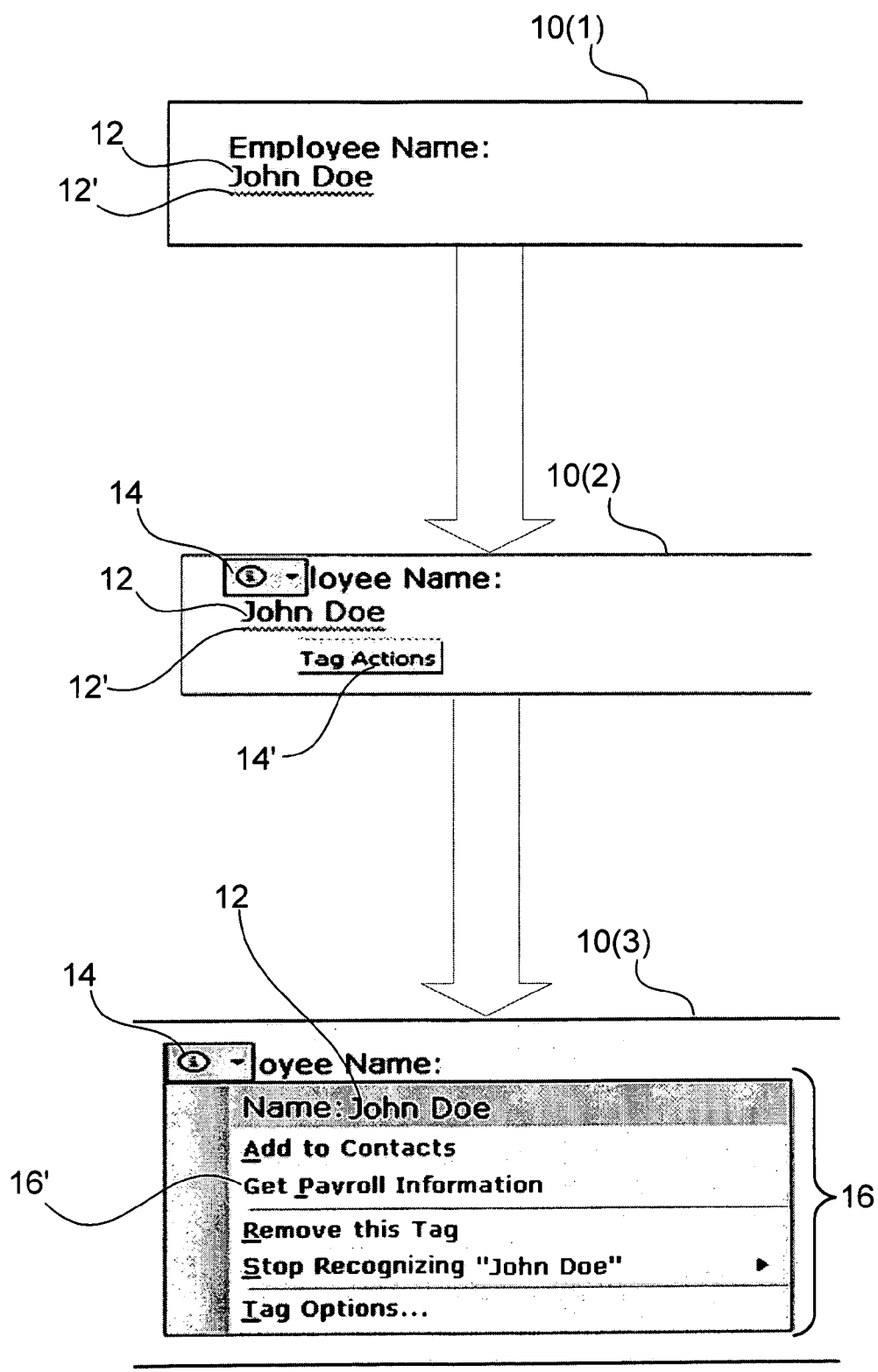
FIG. 1 is a diagram showing one or more interactions with a document with embedded context information that may be used in an embedded information manipulation system.

Information may be embedded in content in a number of ways, such as by including one or more tags 38 in a document 36 depicted in FIG. 1 for exemplary purposes. As will be described in further detail herein, tags 38 may be associated with other data and/or one or more mechanisms that may be configured to retrieve other data. For instance, additional information for some content may be conveyed using text to define a "context," such as customer names inside a purchase order, names of sport players or artists inside a newspaper article, or a stock symbol inside a spreadsheet, for instance.

The context may be defined and bound to additional information available elsewhere, such as line of business host applications ("LOBs"), using hyperlinks, XML links, Tags and other mechanisms that may be embedded within the content, for instance. Microsoft's® SmartTag technology, for example, may employ a mechanism that may embed information relating to the context of some content in a medium where the content itself is expressed, such as a word processing document. Client-side software may interpret such embedded information for a number of purposes as discussed in further detail herein below.

Before proceeding any further, it should be noted that this application discloses subject matter that may be classified in the same or related technical fields as one or more of the pending patent applications identified further below. Further, it is noted that these patent applications may provide further edification of the general technical fields occupied by these applications. Additionally, each of these patent applications may either be assigned or subject to an obligation of assignment to Microsoft® Corporation. As such, the subject matter disclosed in each of the patent applications identified below is incorporated herein by reference in its entirety:

U.S. application Ser. No. 11/133,162, entitled "Flexible Data-Bound User Interfaces", filed May 18, 2005, Burst et al.;

U.S. application Ser. No. 11/135,007, entitled "System And Method For Integrated Management Of Components Of A Resource", filed May 23, 2005, Burst et al.; and U.S. application Ser. No. 10/891,093, entitled "Method and System For Embedding Context Information in a Document", filed Jul. 14, 2004, Ricard Roma i Dalfó.

A specific example involving the Microsoft® SmartTag technology will now be discussed with reference to FIG. 1. As shown in FIG. 1, a first interaction 10(1) involving an employee name 12 (i.e., "John Doe") that may appear in some content, such as a portion of a document, may show the name 12 being recognized as a SmartTag by virtue of a dashed line 12' indication being positioned below employee name 12, although other types of indications could be utilized. In this scenario, the term SmartTag may refer to some contextual information associated with the tagged portion of the document (i.e., employee name 12 "John Doe").

As will be discussed in further detail herein, the SmartTag technology, for example, may include one or more recognizer modules that may examine some content, such as the document involved with interactions 10(1)-10(3) shown in FIG. 1, to identify particular strings or other information for which sets of associated contextual information may be defined and available. This contextual information may be stored in a dynamically linked library ("DLL"), although the contextual information may be stored in other manners, such as embedded directly in the content itself, for example. In any event, the one or more recognizer modules may associate the contextual information with the recognized string and use that data in the manner described further herein with regard to this example.

In a second interaction 10(2) involving the same portion of the document discussed above with regard to the first interaction 10(1), an option button 14 may be used to present a menu of SmartTag actions responsive to a user placing a cursor over dashed line 12', for example. An additional graphic 14' may provide an indication that such a menu exists. As will also be discussed in further detail herein, the Smart-Tag technology may include one or more action handler modules that may process the contextual information associated with the recognized string to provide actions that may be taken involving the recognized string.

In a third interaction 10(3) involving the same portion of the document discussed above with regard to the first and second interactions 10(1) and 10(2), a menu 16 may be presented responsive to activation of the option button 14 during interaction 10(2), although the menu 16 may be presented responsive to other events. Menu 16 may present the various actions that may be taken with regard to the employee name 12 when selected, such as get payroll information 16', for example. Further, the contextual information associated with the tagged portion of the document (i.e., employee name 12 "John Doe"), whether embedded directly within the document or maintained elsewhere, may form the mechanism by which the actions (e.g., get payroll information 16') may be defined.

Further, the one or more Tag action handler modules may use the contextual information embedded within the content, such as the document portion shown in FIG. 1, for any number of purposes, including defining a tool tip that may be presented and/or use additional data included with the contextual information as input for one or more calls to one or more back-end systems to retrieve additional information for performing the associated action, for example.

In this example, the contextual information that may define how the get payroll information 16' action may be performed may include sensitive information that may be provided to one or more back-end systems, such as line of business ("LOBs"), before the particular information associated with the action may be requested and/or obtained, such as a user account identifier, a password and/or a social security number, for example.

Since it may not always be clear what particular information may be embedded in content as contextual information or how that information may ultimately be used, there may be a potential security and/or privacy vulnerability. As such, one or more portions of an embedded information manipulation system 18 generally shown in FIGS. 2-4 may be implemented in an attempt to address at least some of those issues, for example, although the system 18 may have other utility and/or uses as well.

Generally, embedded information manipulation system 18 may provide one or more mechanisms for preserving the privacy and security of information embedded in content despite the absence of any other security related measures, such as digital rights management mechanisms, although the system 18 may perform other functions. Absent the explicit removal of such embedded information altogether, the information and associated content may be preserved and may become available for access to authorized users when appropriate.

Figure 2:
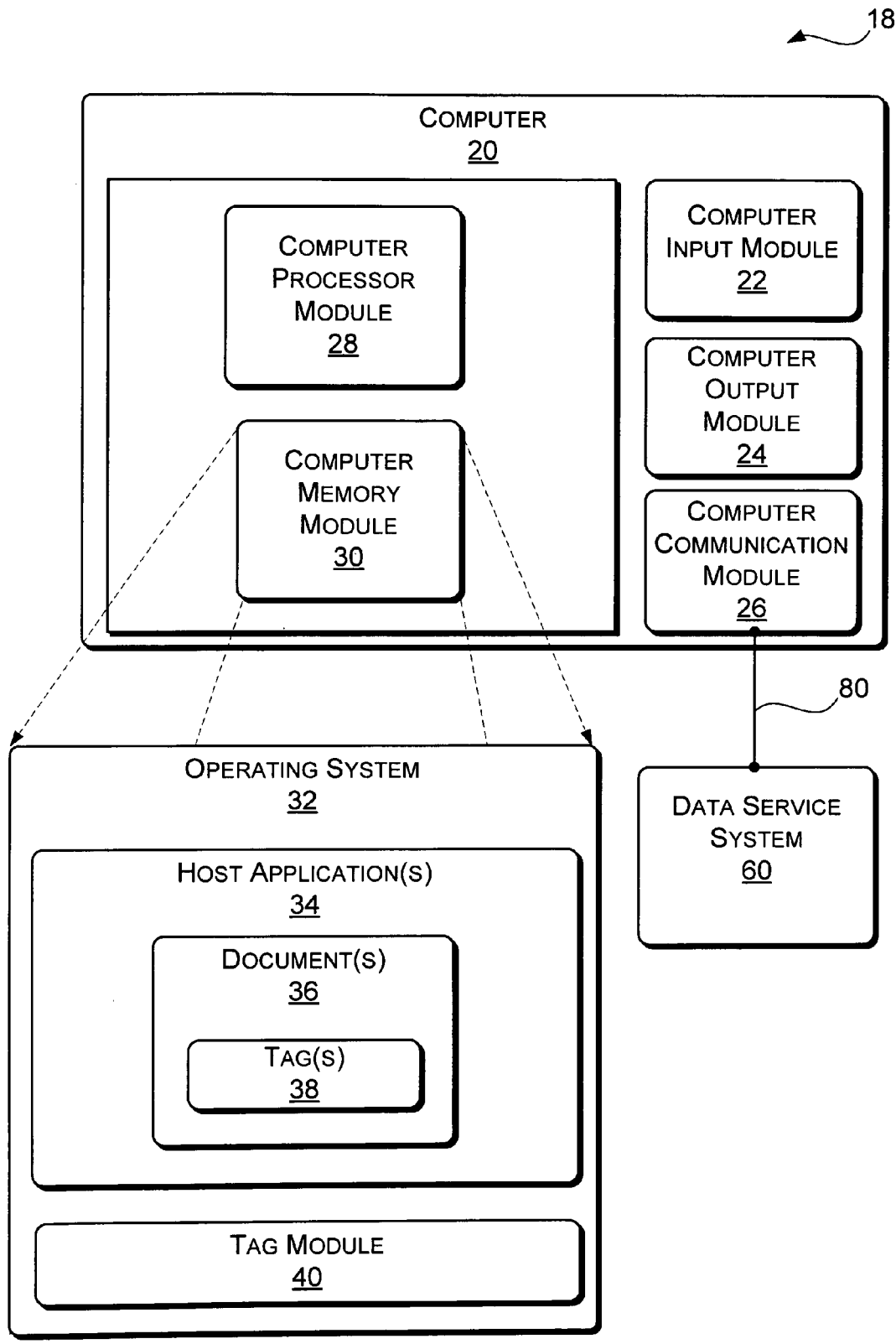
FIG. 2 is a block diagram of one or more components used in an embedded information manipulation system.

Referring more specifically to FIG. 2, an exemplary arrangement of components that may be employed to implement an embedded information manipulation system 18 will now be described. While FIG. 2 shows an example of a suitable operating environment in which such an embedded information manipulation system 18 could be implemented, FIG. 2 is not intended to suggest any limitation as to the scope of use or functionality of such a system 18.

An embedded information manipulation system 18 as depicted in FIG. 2 may generally include at least one computer 20 and at least one data service system 60, which may be communicatively coupled via network 80, for example, although system 18 may include a lesser or greater number and other types of devices. In its most basic configuration, computer 20 may comprise computer input module 22, computer output module 24, computer communication module 26, computer processor module 28 and computer memory module 30, which may be coupled together by one or more bus systems or other communication links, although computer 20 may comprise other modules in other arrangements.

Of course, other types of computing systems, environments, and/or configurations may be suitable for implementing the functions described, herein to implement an embedded information manipulation system 18. For instance, other devices besides computer 20 could be used, including, but not limited to, hand-held, notebook or laptop devices, multiprocessor systems, microprocessor-based systems, programmable consumer electronics, network PCs, minicomputers, mainframe computers, distributed computing environments that include any of the above systems or devices, and the like. In any event, one or more modules and/or other components that may be employed in computer 20 will now be described in further detail with continued reference to FIG. 2.

Computer input module 22 may comprise one or more user input devices, such as a keyboard and/or mouse, and any supporting hardware. Computer input module 22 may enable a user who is operating computer 20 to generate and transmit signals or commands to computer processor module 28, for instance, although other types of user input devices may be used.

Computer output module 24 may comprise one or more user output devices, such as a computer monitor (e.g., CRT, LCD or plasma display), and any supporting hardware, although any other types of output devices may be used, such as one or more printers. Computer output module 24 may present one or more results from computer processor module 28 executing one or more instructions stored in computer memory module 30 as described in further detail herein below.

Computer communication module 26 may comprise one or more communication interface devices, such as wire-based (e.g., Ethernet, serial, USB, Firewire, parallel connections) or wireless network adapters, and any supporting hardware, although other types of communication interface devices may be used. Computer communication module 26 may enable computer 20 to transmit data to and receive data from one or more other devices via network 80, such as data service system 60, although computer communication module 26 may transmit/receive data to/from other computing systems or peripherals (e.g., external memory storage device(s), printer(s)) via other communication media.

Computer processor module 28 may access data and may execute one or more instructions that may be stored in computer memory module 30 for controlling, monitoring and/or managing (hereinafter referred to as "operating") computer input module 22, computer output module 24, computer communication module 26 and computer memory module 30 in the manner described herein, although some or all of the data and instructions may be stored in and/or executed by the modules themselves and/or other devices.

Figure 5:
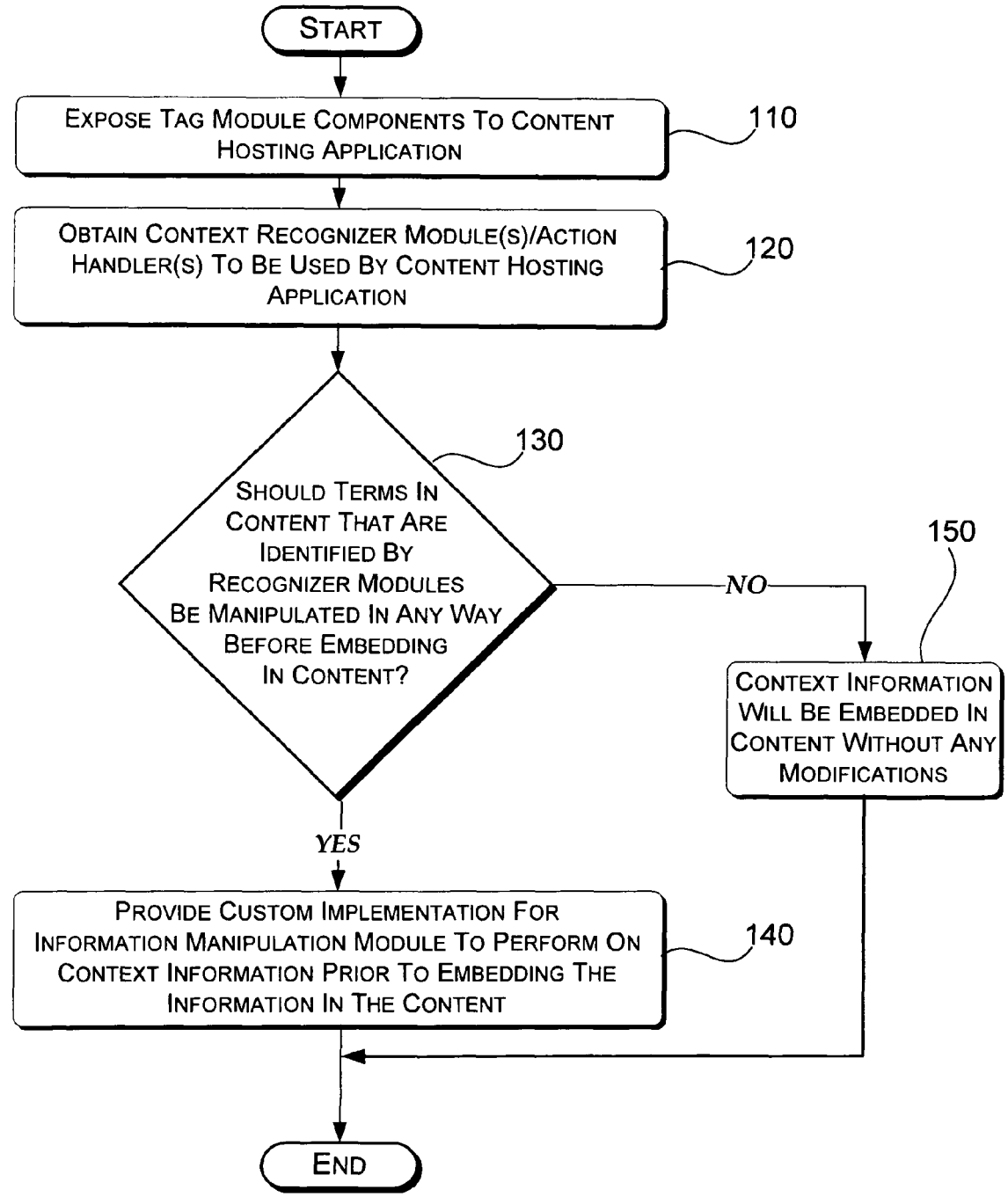
FIG. 5 is a flow chart of a process for configuring a tag module that may process information selected for embedding in content.
Figure 7:
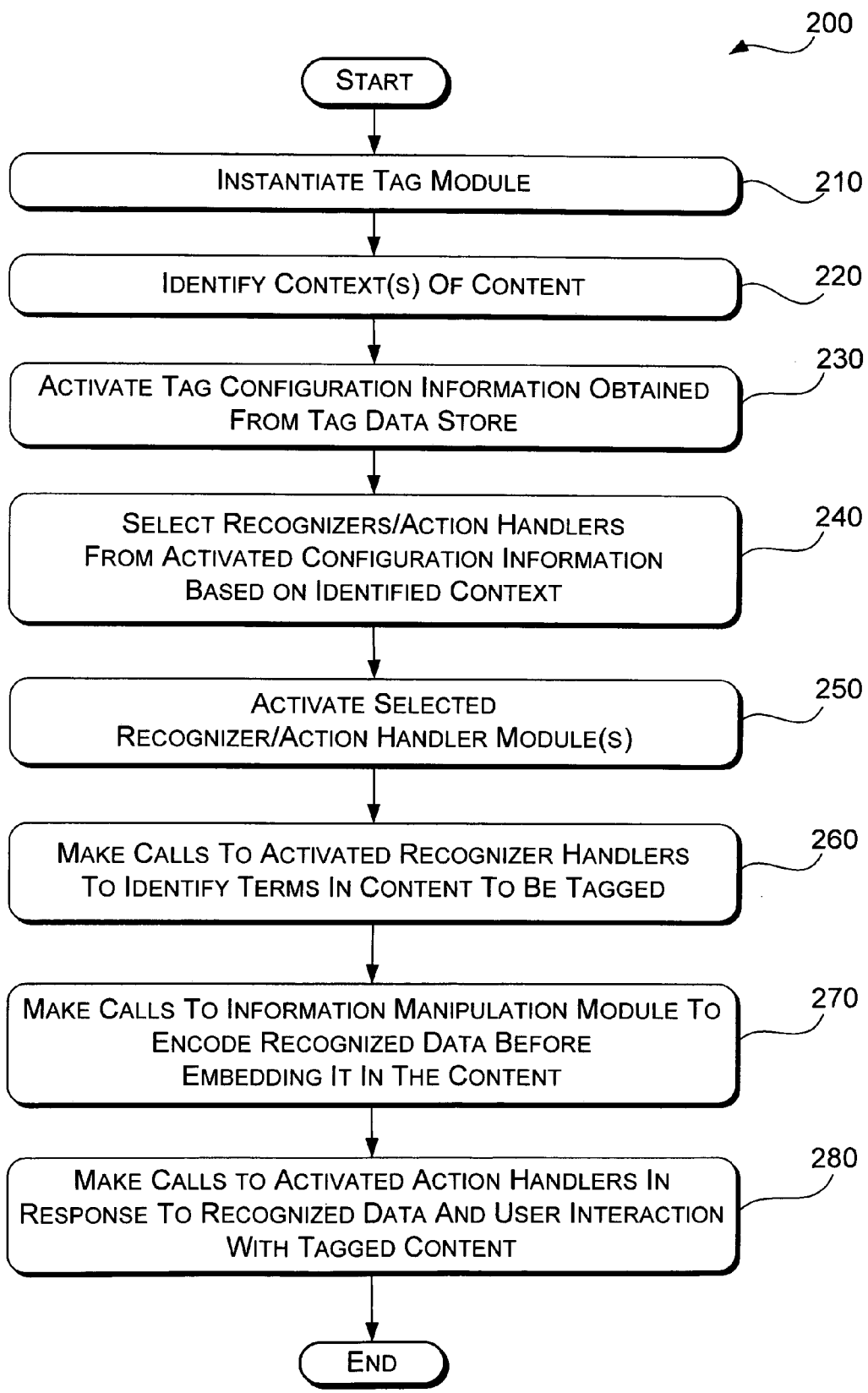
FIG. 7 is a flow chart of a process for embedding context information in content.

Additionally, computer processor module 28 may access data and may execute one or more instructions that may be stored in computer memory module 30 to perform one or more functions for implementing at least a portion of the methods 100, 200 as described herein and illustrated in FIGS. 5 and 7, respectively, although computer processor module 28 may perform other functions, one or more other processing devices or systems may perform some or all of these functions, and computer processor module 28 may comprise circuitry configured to perform the functions described herein.

Computer memory module 30 may comprise one or more types of fixed and/or portable memory accessible by computer processor module 28, such as ROM, RAM, SRAM, DRAM, DDRAM, hard and floppy-disks, optical disks (e.g., CDs, DVDs), magnetic tape, ferroelectric and ferromagnetic memory, electrically erasable programmable read only memory, flash memory, charge coupled devices, smart cards, or any other type of computer-readable media, which may be read from and/or written to by one or more magnetic, optical, or other appropriate reading and/or writing systems that may be coupled to computer processor module 28 and/or one or more other processing devices or systems.

Further, computer memory module 30 may store at least a portion of the data and instructions that may be accessed and/or executed by computer processor module 28 for operating computer input module 22, computer output module 24, computer communication module 26 and computer memory module 30, although some or all of the data and instructions may be stored elsewhere, such as in the modules themselves, in the computer processor module 28 itself, and/or at one or more other devices or systems.

Additionally, computer memory module 30 may store at least another portion of data and/or instructions for implementing at least a portion of the methods 100, 200 illustrated in FIGS. 5 and 7. Further, these other portions of data and/or instructions are illustrated as one or more components or modules, such as operating system 32 and its associated components, which are described in greater detail below with continued reference to FIG. 2.

Operating system 32 may comprise any operating system that the computer 20 may support based on one or more requirements of the computer processor module 28. A number of different types of operating systems could be used, however, including any of the Microsoft® Windows® suite of operating systems, Unix based operating systems, Linux based operating systems, and any other current or later developed operating system.

Host application(s) 34 may comprise any application that the operating system 32 may support. As an example, the host applications 34 may comprise office productivity host applications, such as MICROSOFT® WORD®, MICROSOFT® EXCEL®, MICROSOFT® OUTLOOK®, MICROSOFT® POWERPOINT®, any other MICROSOFT® OFFICE® application, or any other application made by other software developers.

Document(s) 36 may comprise any medium that may be used to interact with content which may be manipulated via one or more host application(s) 34, such as word processing content maintained in one or more files residing in computer memory module 30, for example, although document(s) 36 may comprise other types of content including, but not limited to, text based documents, Web content, and any other type of content that may bear or otherwise convey information. Further, document(s) 36 may include one or more tag(s) 38.

Generally, tag(s) 38 may comprise context information that may provide additional information describing the content that may be expressed in document(s) 36. In some embodiments, the "context" of a document refers to the purpose and use of the document. Examples of a document's context may include information identifying the particular one or more host application(s) 34 that may have been used to generate and/or otherwise interact with one or more of document(s) 36, one or more style sheets that may have been used in generating one or more of document(s) 36, one or more properties of one or more of document(s) 36, and any other type of context information that may describe some associated content (e.g., document(s) 36).

Figure 3:
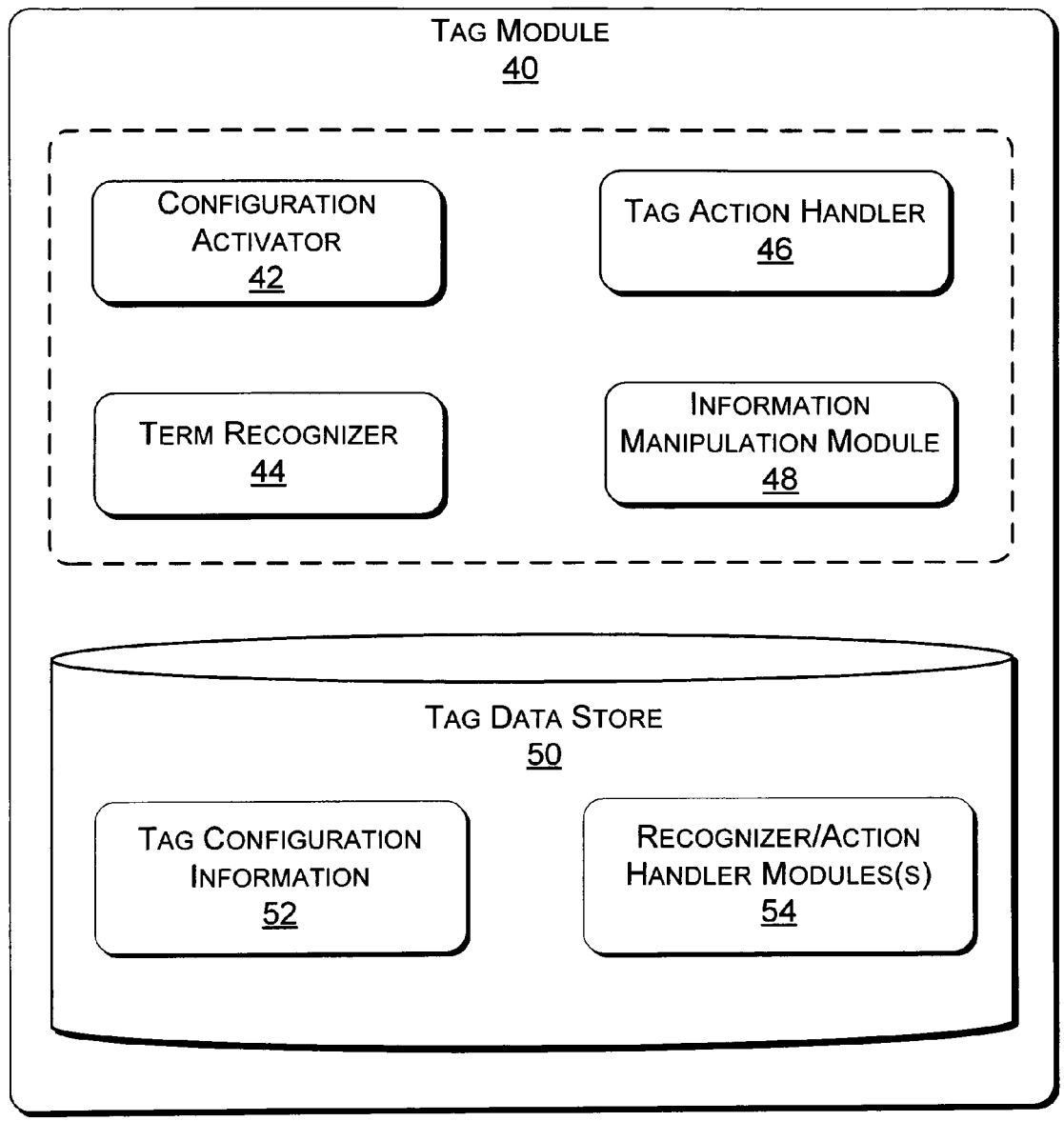
FIG. 3 is a block diagram of a tag module that may be used in the embedded information manipulation system shown in FIG. 2.

Referring now to FIG. 3, tag module 40 may comprise configuration activator 42, term recognizer 44, tag action handler 46 and/or information manipulation module 48. While tag module 40 is depicted as comprising several components or modules, it should be appreciated that these components or modules have been illustrated in the particular manner shown in FIG. 3 for ease of description and illustration purposes only, as the functionality of the modules and components described herein with regard to tag module 40 may be distributed among one or more systems and/or may be combined and/or separated into a fewer or greater numbers of components and/or modules. Moreover, while tag module 40 is shown as residing on computer 20, in other environments module 40 may reside elsewhere, such as data service system 60, for example.

As such, generally, tag module 40 may exchange information with tag data store 50 to implement a number of functions that may relate to embedding, recognizing and/or performing one or more actions that may be described via context information embedded in one or more portions of content, such as document(s) 36 shown in FIG. 2, although the module 40 may exchange information with one or more other systems.

Configuration activator 42 may comprise one or more mechanisms that may load configuration information from tag data store 50 mentioned above, for example, although loader 42 may load the configuration from one or more other modules and/or devices.

Term recognizer 44 may comprise one or more mechanisms that may make one or more calls to one or more recognizer modules that may be activated from tag data store 50, for example, although recognizer 44 may make one or more calls to one or more other modules and/or devices.

Tag action handler 46 may comprise one or more mechanisms that may make one or more calls to one or more one or more recognizer/action handler module(s) 54 that may be activated from tag data store 50, for example, to perform one or more actions that may be defined in whole or in part by context information that may be embedded in content (e.g., document(s) 36), although handler 46 may make one or more calls to one or more other modules and/or devices.

For instance, in a Microsoft® Windows XP® environment where one or more MICROSOFT® OFFICE® applications may be employed, tag action handler 46 may call one or more recognizer/action handler module(s) 54 that may enable handler 46 to evaluate one or more expressions that may be embedded in one or more document(s) 36 as one or more tag(s) 38 based on the .NET framework, although action handler 46 may evaluate and handle one or more actions in a number of other ways depending on the environment system 18 may be employed in.

Information manipulation module 48 may comprise one or more mechanisms that may transform one or more portions of context information that may be embedded in document(s) 36 from a current format into a different format to protect the context information from unauthorized viewers, although module 48 may transform the context information into a number of other formats for a number of other reasons, such as for transforming one or more portions of the context information that may be expressed using a particular format or syntax that may be different than a format or syntax utilized by one or more systems that the transformed information may be provided to, for example.

In a Microsoft® Windows® XP environment, for instance, information manipulation module 48 may employ a codec component that may be implemented to encrypt context information before or at the same time it may be embedded in one or more portions of document(s) 36, although the information manipulation module 48 in such a Windows® environment could employ any number of other types of substantially equivalent components that may perform substantially equivalent functions to obtain substantially equivalent results.

Generally, codecs may refer to software objects that may be used for packaging and/or unpackaging one or more portions of data. For instance, Microsoft® Windows® Median Player may use one or more codecs to decrypt and/or uncompress Windows® Media® files and/or streams. Further, a DVD player may use a codec to decrypt, uncompress and/or display data in the MPEG-2 format that may be stored on a DVD or some other medium. The Microsoft® Information Bridge Framework ("IBF") technology, which supports the use of SmartTags, may use codecs for storing and/or retrieving SmartTag and/or hyperlink data in a specific manner. In the IBF environment, the codec may encode one or more populated IContextInformation objects into one or more corresponding SmartTags or hyperlinks that may be embedded in some content. The codec may also be employed for decoding one or more encoded IContextInformation objects.

Furthermore, information manipulation module 48 may be exposed to one or more other modules associated with tag module 40 by way of one or more application program interfaces (hereinafter referred to as "APIs" and variations thereof), for example, as will be described in further detail herein below, although module 48 may be exposed to one or more other modules, and module 48 may be exposed to any module in any other way besides APIs depending upon the particular environment system 18 may be employed in.

Tag data store 50 may include tag configuration information 52 and one or more recognizer/action handler module(s) 54. While tag data store 50 is depicted as a single component logically organized within tag module 40, and hence computer memory module 30, one or more portions of the data store 50 may reside elsewhere, such as being distributed among one or more networked systems (e.g., computers) and/or at one or more server machines.

Tag configuration information 52 may comprise information that may identify the location of one or more of the recognizer/action handler module(s) 54. For example, the configuration information 52 may include one or more references pointing to the one or more recognizers and/or action handler modules 68, although the information 52 may identify the recognizer/action handler module(s) 54 in other ways. Further, tag configuration information 52 may be expressed in the form of metadata written in a declarative markup language, such as XML, although the configuration information may be included in a file, document, or other suitable form using any form of syntax or declarative/programming language.

Recognizer/action handler module(s) 54 may comprise one or more mechanisms that may function as context-specific recognizers and/or action handlers, although module(s) 54 may function as one or more generic recognizers and/or action handlers that may be used for one or more host application(s) 34 without necessarily being associated with any particular contexts. In this way, context-specific recognizers and/or action handlers may be dynamically activated and/or deactivated by computer processor module 28 when no longer needed at run-time to potentially increase the number of relevant tag(s) 38 that may be recognized while potentially reducing the number of irrelevant tag(s) 38 from being recognized.

For instance, one or more recognizers maintained in recognizer/action handler module(s) 54 may comprise one or more mechanisms that may provide computer processor module 28 with one or more instructions to be executed for identifying one or more portions of information that may be embedded in content, such as one or more tag(s) 38 in document(s) 36. As another example, one or more action handlers maintained in recognizer/action handler module(s) 54 may comprise one or more mechanisms that may provide computer processor module 28 with one or more instructions to be executed for implementing one or more actions defined in the one or more identified portions of embedded information (e.g., one or more tag(s) 38 in document(s) 36).

Figure 4:
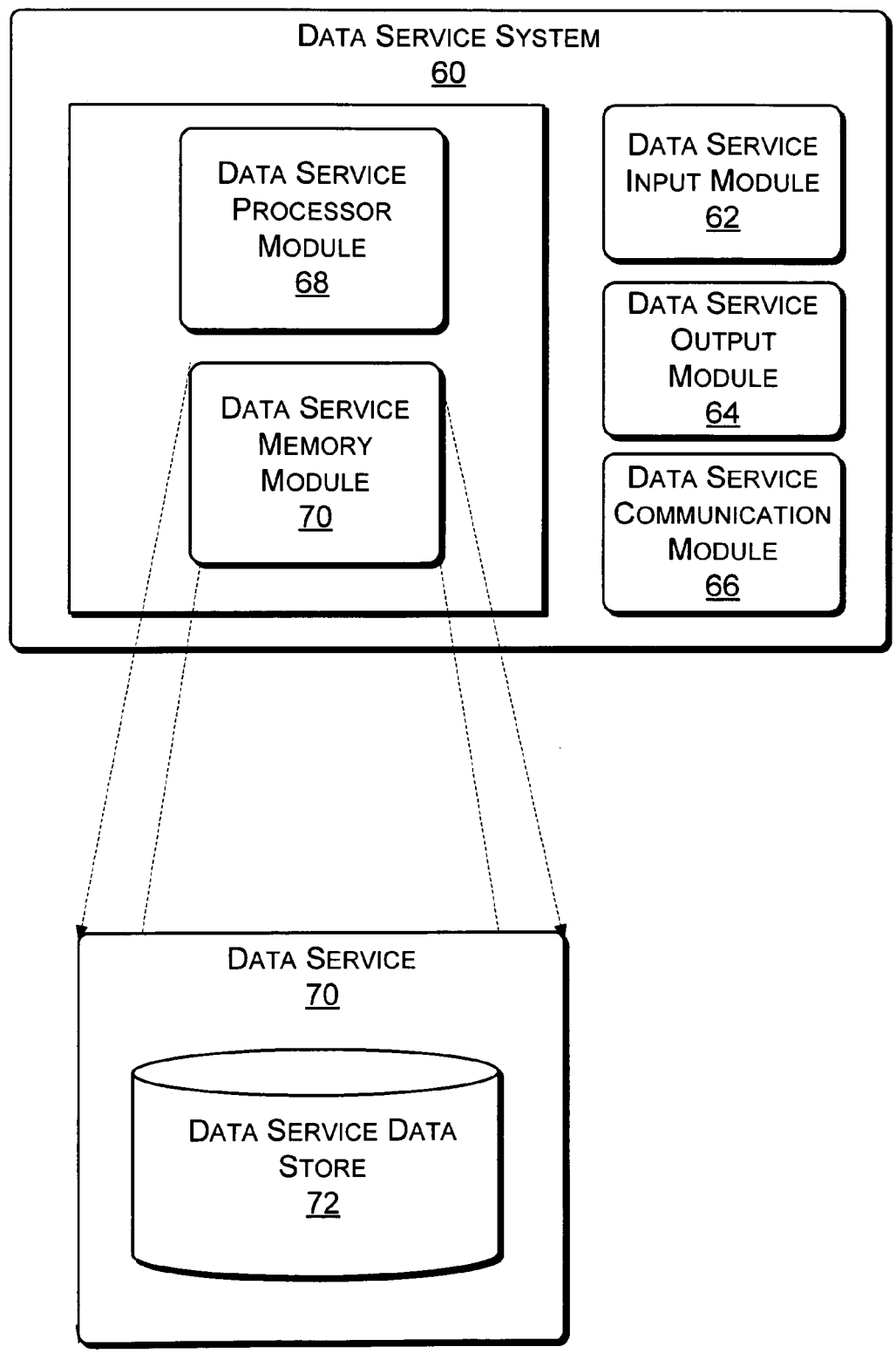
FIG. 4 is a block diagram of data service system that may be used in the embedded information manipulation system shown in FIG. 2.

Referring to FIG. 4, an example of the data service system 60 depicted in FIG. 1 that may be employed in embedded information manipulation system 18 will now be described, although other systems and/or devices may be employed. In its most basic configuration, data service system 60 may comprise data service input module 62, data service output module 64, data service communication module 66, data service processor module 68 and data service memory module 70, which may be coupled together by one or more bus systems or other communication links, although data service system 60 may comprise other modules in other arrangements.

Data service input module 62 may comprise one or more user input devices, such as a keyboard and/or mouse, and any supporting hardware. Data service input module 62 may enable a user who is operating data service system 60 to generate and transmit signals or commands to data service processor module 68, for instance, although other types of user input devices may be used.

Data service output module 64 may comprise one or more user output devices, such as a computer monitor (e.g., CRT, LCD or plasma display), and any supporting hardware, although any other types of output devices may be used, such as one or more printers. Data service output module 64 may present one or more results from data service processor module 68 executing one or more instructions stored in data service memory module 70, for example, as described in further detail herein below.

Data service communication module 66 may comprise one or more communication interface devices, such as wire-based (e.g., Ethernet, serial, USB, Firewire, parallel connections) or wireless network adapters, and any supporting hardware, although other types of communication interface devices may be used. Data service communication module 66 may enable data service system 60 to transmit data to and receive data from one or more other devices via network 80, such as one or more computers 20, although data service communication module 66 may transmit/receive data to/from other computing systems or peripherals (e.g., external memory storage device(s), printer(s)) via other communication media.

Data service processor module 68 may access data and may execute one or more instructions that may be stored in data service memory module 70 for operating data service input module 62, data service output module 64, data service communication module 66 and/or data service memory module 70 in the manner described herein, although some or all of the data and instructions may be stored in and/or executed by the modules themselves and/or other devices.

Additionally, data service processor module 68 may access data and may execute one or more instructions that may be stored in data service memory module 70 to perform one or more functions for implementing at least a portion of the methods 100, 200 as described herein and illustrated in FIGS. 5 and 7, although data service processor module 68 may perform other functions, one or more other processing devices or systems may perform some or all of these functions, and data service processor module 68 may comprise circuitry configured to perform the functions described herein.

Data service memory module 70 may comprise one or more types of fixed and/or portable memory accessible by data service processor module 68, such as ROM, RAM, SRAM, DRAM, DDRAM, hard and floppy-disks, optical disks (e.g., CDs, DVDs), magnetic tape, ferroelectric and ferromagnetic memory, electrically erasable programmable read only memory, flash memory, charge coupled devices, smart cards, or any other type of computer-readable media, which may be read from and/or written to by one or more magnetic, optical, or other appropriate reading and/or writing systems that may be coupled to data service processor module 68 and/or one or more other processing devices or systems.

Further, data service memory module 70 may store at least a portion of the data and instructions that may be accessed and/or executed by data service processor module 68 for operating data service input module 62, data service output module 64, data service communication module 66 and data service memory module 70, although some or all of the data and instructions may be stored elsewhere, such as in the modules themselves, in the data service processor module 68 itself, and/or at one or more other devices or systems.

Additionally, data service memory module 70 may store at least another portion of data and/or instructions for implementing at least a portion of the methods 100, 200 illustrated in FIGS. 5 and 7. Further, these other portions of data and/or instructions are illustrated as one or more components or modules, such as data service 70 and data service data store 72. Data service 70 may comprise an line of business ("LOB") software system, such as SAP or SIEBLE, although data service 70 may comprise other types of LOB systems or other types of data store services, such as Web services, or any other type of server application. LOB systems, such as SAP and SIEBEL, are types of enterprise or business related software.

Data service data store 72 may comprise one or more data repositories where the data provided by data service 70 may be maintained. While data service data store 72 is depicted as a single component logically organized within data service 70, and hence data service memory module 70, one or more portions of the data service data store 72 may reside elsewhere, such as being distributed among one or more networked systems (e.g., computers) and/or at one or more server machines.

Referring back to FIG. 2, network 80 may comprise a Wide Area Network ("WAN"), such as the Internet, which may communicatively couple at least one computer 20 and at least one data service system 60 together in system 18, although a variety of other communication systems and/or methods using appropriate protocols may be used, including other types of WANs, local area networks, wireless networks, phone lines, serial and/or parallel bus cables, coaxial cables, and combinations thereof.

An example of a method 100 that may be implemented to configure a tag module 40 for processing information selected for embedding in content will now be described with reference to FIGS. 5-6 in the context of being carried out by embedded information manipulation system 18 described above in connection with FIGS. 1-4. Referring to FIG. 5 and beginning at step 110, by way of example only, a user of computer 20, such as an organization's computer administrator, may desire making tag module 40 available for implementation by host application(s) 34, such as for embedding context information in document(s) 36 being hosted by host application(s) 34, for instance.

The context information may be embedded in document(s) 36 for any number of reasons, such as for enabling particular actions to be performed responsive to particular data being associated with document(s) 36 being hosted by host application(s) 34 during a computer users' interaction with the content, for example.

The context information that may be embedded in the content may represent sensitive or otherwise private information in some cases. For instance, the context information may describe one or more terms or data types to be identified whenever they are associated with the content, such as an employee name. In the context of system 18 described earlier, such terms may be identified by term recognizer 44 in tag module 40.

Further, the context information may describe one or more actions to be performed by tag action handler 46 in tag module 40 responsive to term recognizer 44 identifying the terms described by the context information. For instance, an action that may be associated with a particular term, such as an employee name, may relate to obtaining payroll information for one or more identified employee names that may be included in the content, for example.

As such, the organization's computer administrator may operate a text editing application, for example, which may be implemented by computer 20 to generate one or more code instructions for accessing and/or configuring tag module 40. The administrator may use one or more of the computer's input module 22, in conjunction with operation of one or more of the computer output module 24, computer communication module 26, computer processor module 28 and/or computer memory module 30, to embed context information depicted as one or more tags 38 in document(s) 36 as shown in FIG. 6.

In this example, the administrator may desire one or more particular actions to be performed when tag module 40 identifies the presence of one or more selected terms in document(s) 36 hosted by application 34. For instance, tag module 40 may associate one or more markers with portions of document(s) 36 representing the selected terms that are identified that may be depicted in the manner shown in FIG. 6.

Figure 6:
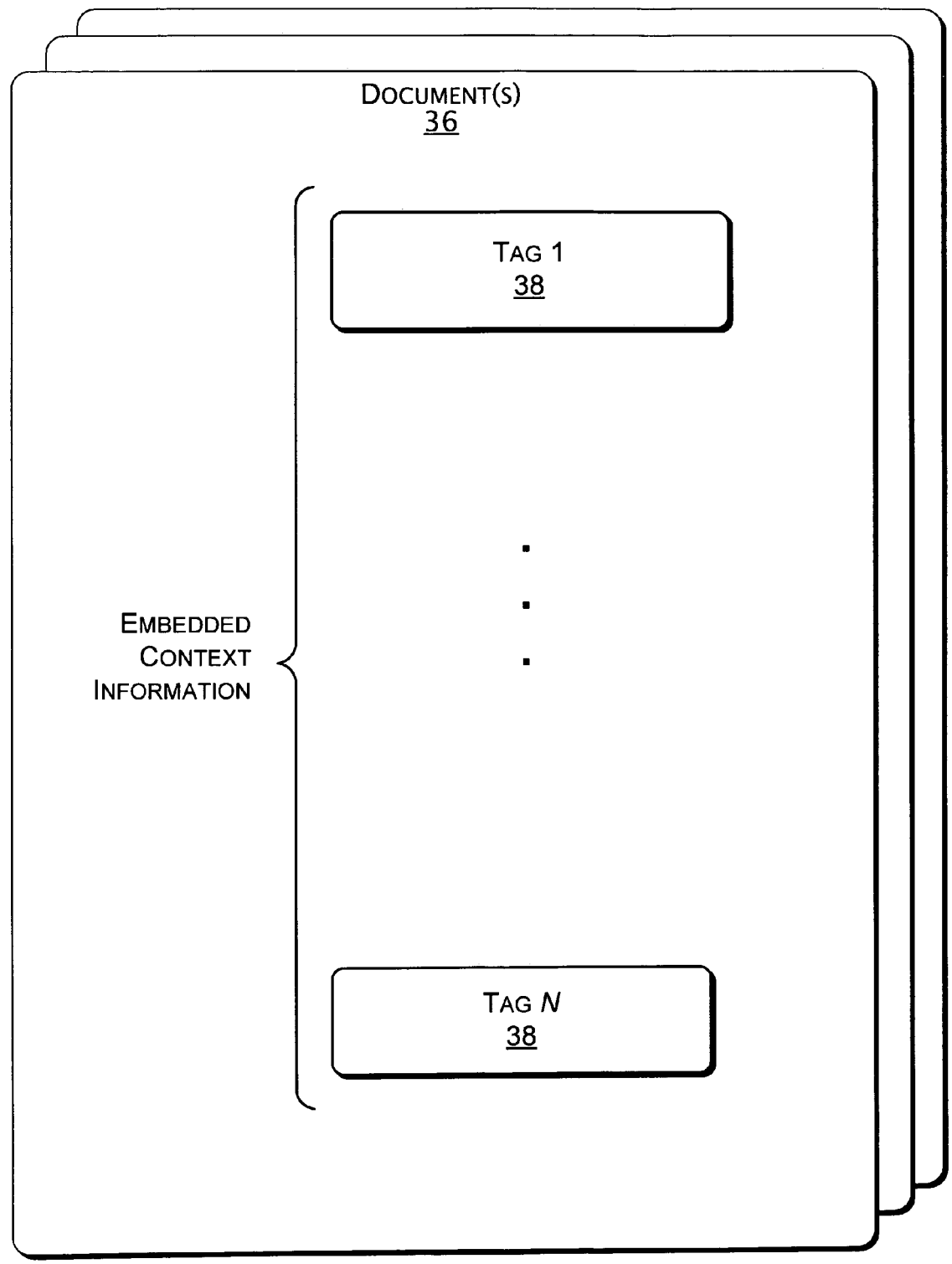
FIG. 6 is a block diagram of a document with one or more embedded tags that may be generated by an embedded information manipulation system.

As shown in FIG. 6, one or more tag(s) 38 in document 36 may identify one or more terms in document(s) 36 that may have been recognized by tag module 40 and which may be associated with one or more actions to be taken, such as obtaining payroll information for an employee identified by the recognized term depicted as tag 38 in FIG. 6, for instance. Such payroll information may be obtained from data service system 60, for example. However, one or more portions of the information that may be considered sensitive, such as an employee's social security number, may be requested from the tag module 40 in computer 20 as a condition for obtaining the requested information, for instance.

In this example, one or more mechanisms implemented in the tag module 40 in computer 20, such as information manipulation module 48, may provide a way to structure the one or more tag(s) 38 and/or other modules related to defining the context of a particular portion of the content, such as one or more terms to be recognized and/or one or more actions to be performed.

The administrator may generate one or more registry entries that may be managed by operating system 32 on computer 20 to make one or more components of the tag module 40 available to host application 34, for example, although the tag module 40 components may be made available to tag module 40 in other ways depending upon the particular operating system 32 and environment the tag module 40 may be implemented in. A script may be generated and deployed remotely over network 80 to be pushed onto computer 20 for execution by computer processor module 28 when another user of computer 20 operates host application 34 to interact with one or ore document(s) 36 to perform the registrations, for example.

At step 120, the administrator may develop one or more recognizer/action handler module(s) 54 for one or more document(s) 36 hosted by host application 34, although tag module 40 may provide one or more default recognizer/action handler module(s) 54 that may be implemented for recognizing default terms and for performing default actions for the recognized default terms. However, if the administrator generates a new recognizer module in an environment that may utilize Microsoft's® IRecognizer interface, the user may simply provide an implementation for an available .Recognize2( . . . ) method call, for instance.

Additional information regarding the IRecognizer interface is available from Microsoft®, which is incorporated by reference herein in it's entirety. Further, more detailed implementation information related to the Microsoft® implementation of the SmartTag technology in general is provided in the "Information Bridge Framework 1.5 Solution Development Guide" and in the "Microsoft® Office® Information Bridge Framework 1.5 Software Development Kit (SDK) Documentation," both of which are currently available at www.microsoft.com, which are incorporated by reference herein in their entirety.

In particular, one or more class libraries may be generated for defining one or more custom action handlers and/or corresponding recognizers (hereinafter referred to as one or more "context assemblies" and variations thereof) as source code by referencing one or more current Microsoft® NET assemblies, which presently includes the following libraries: Microsoft.InformationBridge.Framework.Interfaces.dll; Microsoft. InformationBridge.Framework.UI.Interop.dll; and the Microsoft Smart Tags 2.0 Type Library, although earlier or later developed versions of these libraries and other equivalent mechanisms that may be employed in other operating/network environments may be referenced as well.

In this specific example, referencing these libraries may cause computer processor module 28 to install one or more executable instructions made available via the libraries in a global assembly cache that may reside in computer memory module 30, for example, although the libraries may be made available and maintained in other ways in other environments.

Further, when computer processor module 28 operates host application 34 for hosting document(s) 36, term recognizer 44 in tag module 40 may identify one or more terms in user input entered in connection with document(s) 36 that may match the terms for which one or more recognizer handler modules 54 in tag data store 50 may be configured to identify in content.

At step 130, if the administrator decides to employ information manipulation module 48 for manipulating the context information in some fashion before embedding it in document(s) 36, such as for encoding it, then the YES branch may be followed to step 140. Otherwise, the No branch may be followed to step 180 if the administrator decides not to employ information manipulation module 48 for manipulating the context information, such as for encoding it.

At step 140, the administrator may generate a custom implementation for information manipulation module 48 by defining one or more encoding and/or decoding methods for a class that may be derived from a default class used by module 48 that may override the corresponding default methods that would otherwise be implemented by information manipulation module 48.

The encode method may be defined to perform any number of encoding functions, although other data manipulation operations could be performed. Basically, the encode method may encode a populated IContextInformation object into a tag that may be embedded in content, although the IContextInformation object may be encoded into hyperlinks and other types of data as well. Further, the encode method may use a number of parameters, including a parameter for receiving the context information to be encoded in the method, a parameter for receiving one or more values describing properties of one or more tag(s) 38, and a parameter for receiving data that may have been associated with the content that may be considered sensitive and may be encoded in the method.

The decode method may be defined to perform any number of decoding functions. Basically, the decode method may decode a Tag into a populated IContextInformation object, although hyperlinks and other types of data may be decoded as well. Further, the decode method may use a number of parameters, including a parameter for returning context information as an IContextInformation object, for example, a parameter for receiving one or more encoded values describing properties of one or more tag(s) 38, and a parameter for receiving encoded data that may have been associated with the content that may be considered sensitive.

For example, in a Microsoft® XP® operating system environment where the Information Bridge Framework ("IBF") may be implemented, the administrator may derive a class from the abstract codec class that is available in the Microsoft.InformationBridge.Framework.UI.Interop assembly in the IBF environment, for example, to generate a custom implementation for the Defaultcodec class. The default codec may be accessed via the Façade class that is specified in Microsoft.InformationBridge.Framework.UI.Interop in a call to Façade.SmartTags.DefaultCodec.

Further, one or more IBF methods defined in Façade.SmartTags.DefaultCodec may be utilized for overriding the Encode and/or Decode methods that may be used by default in the IBF environment. To sum up the procedure for generating a custom codec in the IBF environment, a new class may be created from Microsoft.Information Bridge.Framework.UI.Interop.Codec where the Encode and Decode methods are overridden. Further, an instance of the newly generated class may be passed to the recognizer module associated with the content, and an instance of the class may also be passed out of the Codec property.

The administrator may deploy a compiled assembly that includes the custom implementation of the DefaultCodec class in the same location (e.g., directory) where the IBF components may reside in the memory of computer 20, for example. Further, the administrator may now register the custom implementation of the DefaultCodec class by modifying the IBF configuration file to add the following:

"<add key="smartTagCodec"Value="CustomCodecNamespace.CustomCodecClass,CustomCodecAssembly"/>

By default, Façade.SmartTags.CurrentCodec may hold an instance of the DefaultCodec. However, performing the steps described above to generate the custom codec, override the encode/decode methods in the DefaultCode class, and register the custom codec with IBF may result in Façade.SmartTags.CurrentCodec holding an instance of the newly generated custom encoder instead of the DefaultCodec. Thereafter, any encoding and/or decoding that may be performed in the IBF environment may utilize the custom encoder.

At step 150, since the administrator may have decided at step 130 that the context information may not be encoded before embedding in the content, any terms identified by one or more recognizer handlers may result in the associated terms and context information being embedded in the content without being manipulated or altered.

Further, one or more instructions embodying the functions described above in connection with step 110-140 may be compiled and/or registered with the host application 34 so that information in document(s) 36 may be recognized, encoded/decoded and/or embedded in content in the manner described above in method 100 when application 34 activates document(s) 36 in a method 200 described further herein below, for example.

Figure 8:
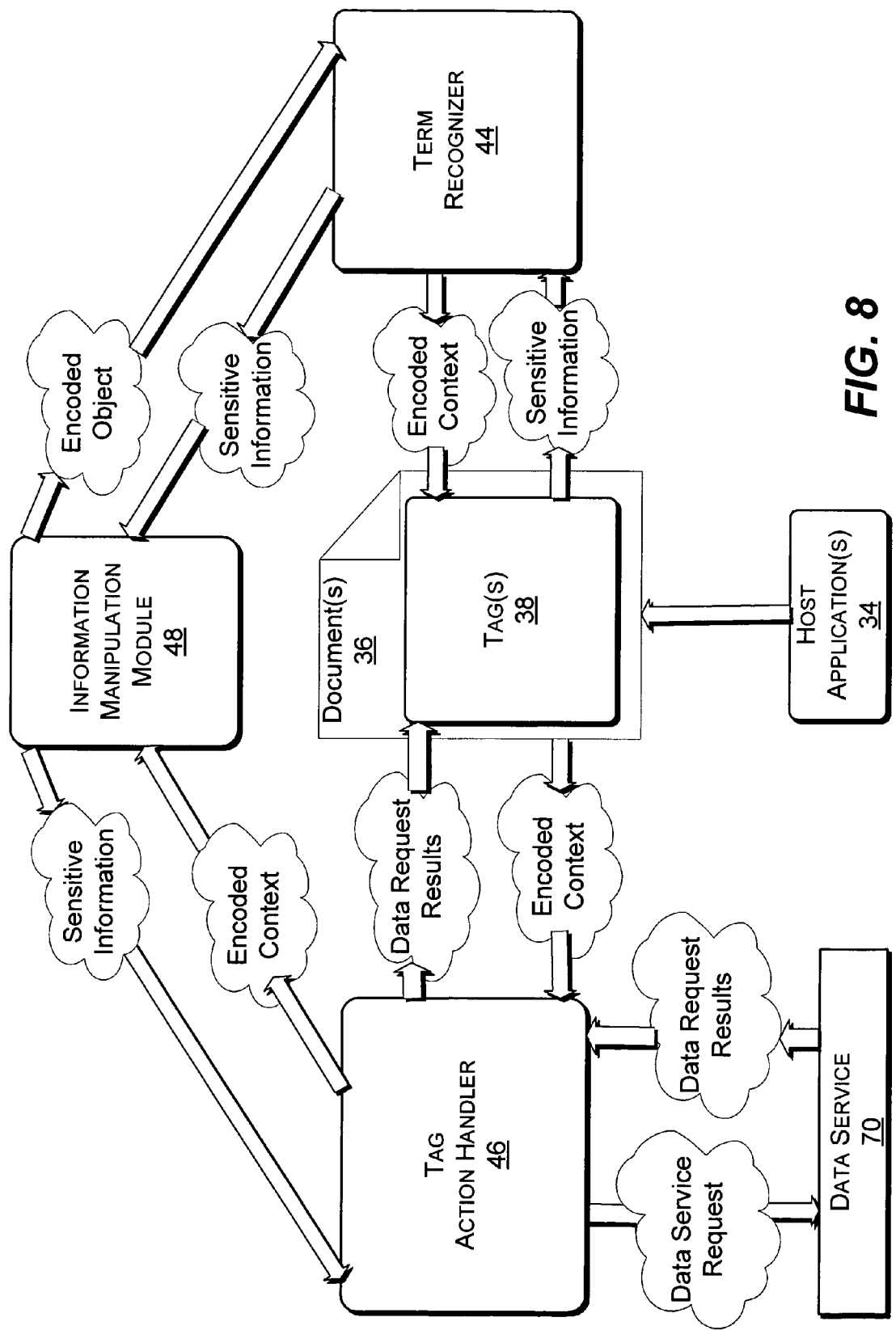
FIG. 8 is a functional block diagram depicting a flow of communication among one or more components in an embedded information manipulation system.

An example of a method 200 that may be implemented for embedding information in content will now be described with reference to FIGS. 7-8 in the context of being carried out by embedded information manipulation system 18 described above in connection with FIGS. 1-4. Referring to FIG. 7 and beginning at step 210, by way of example only, a user of computer 20 may operate one of host application(s) 34 for editing one of document(s) 36, for example.

At step 210, tag module 40 is instantiated in response to the user opening the document 36 since tag module 40 is registered with the host application 34 (e.g., when tag module 40 was installed in computer 20).

At step 220, configuration activator 42 of tag module 40 is configured to determine the context(s) of the document 36, for example, by examining one or more of: the properties of the document; a style sheet for the document; the host application used to create the document; a schema attached to the document; or any other relevant information contained in the document. Contexts and the mechanism(s) to identify them are typically created by the developers of the host applications 34, although in some scenarios, third party developers may extend the contexts. The developers also create the corresponding context-specific recognizers and action handler modules 54 that are stored in tag data store 50. Some documents 36 may not have any identifiable context.

At step 230, tag configuration information 53 is obtained from tag data store 50 and is activated. In an IBF environment, the tag data store 50 may comprise an IBF configuration file and the tag configuration information 53 may comprise one or more IBF configuration objects that may be populated with the configuration information.

At step 240, one or more recognizers/action handler modules 54 are obtained from tag data store 50 and activated. Configuration activator 42 selects one or more recognizer/action handler module(s) 54 of those contained in tag configuration information 52 based on the document's context as identified in block 220. When no context was identified in block 220, then configuration activator 42 can select a default set of recognizer/action handler module(s) 54. The deployer and/or administrator can define and modify this default set.

At step 250, the recognizer/action handler module(s) 54 selected at step 240 are then obtained from tag data store 50 and activated. For instance, configuration activator 42 may send one or more requests that may identify the location of the selected recognizer/action handler module(s) 54 obtained from tag data store 50 for the selected recognizer/action handler module(s) 54. In response to these requests, configuration activator 42 will receive the selected recognizer/action handler module(s) 54 from tag data store 50.

One or more of the recognizer/action handler module(s) 54 can be in the form of DLLs written by developers, which the deployer and/or administrator would store in tag data store 50, although recognizer/action handler module(s) 54 may also be expressed in a form representing a regular expression (e.g., an expression according to the previously mentioned .NET framework) or expressions from different frameworks or languages can be used or created. The expression, when evaluated, identifies patterns or strings in pieces of text.

At step 260, recognition operations are performed on the document 36 using the recognizers activated at step 250. For instance, term recognizer 44 selects pieces of data from the document 36 and, for each piece of data, makes calls to the activated recognizers to determine if there are tag(s) 38 associated with this piece of data. This allows the developer to simplify the implementation of an activated recognizer because each recognizer only needs to implement one method call.

At step 270, tag module 40 may generate context information and associate a reference into a property bag object to encode the recognized term and its associated context information using the custom encode method that may have been defined above in method 100 at step 140, for instance. An example of one or more portions of code that may express these actions for the IBF environment, which may be implemented when tag module 40 recognizes a term in document 36, is provided below:

ISmartTagProperties propertyBag=recognizerSite.
GetNewPropertyBag( );
Facade.SmartTagCodecs.CurrentCodec.Encode(contextInformation, propertyBag, recognizedText);

Further, tag module 40 may call a CommitSmartTag method that may embed the encoded reference and encoded property bag object into document 36. An example of one or more portions of code that may express these actions for the IBF environment is provided below:

recognizerSite.CommitSmartTag("http://schemas.microsoft.com/InformationBridge/2004#reference", startIndex, termLength, propertyBag);

Calling the CommitSmartTag method in an IBF environment may embed one or more portions of XML associated with the tag 38 into document 36 at the position where the term was recognized. The portions of embedded XML may include information that tag module 40 may use to associate the particular tag 38 with a view of specific information associated with the tag.

At step 280, action handling operations are performed on the document 36 using the action handlers activated at step 250, for example. When a tag 38 is used by a user, tag action handler 46 is activated and tag module 40 routes that execution to the appropriate action handler module(s) 54 that may have been dynamically activated at step 250. Tag action handler 46 may perform one or more actions defined for the recognized term. For instance, the tag module 40 may recreate the context from the smart tag properties by calling the decoder method defined in method 100 at step 140. An example of one or more portions of code that may express these actions in the IBF environment is provided below:

cache.ContextInformation=Codec.Decode(properties, text);

While methods 100 and 200 have been illustrated and described above sequentially, it should be appreciated that the operations described in the method step blocks may be performed in different orders, multiple times, and/or in parallel. While several of the examples provided above involved IBF technology, context information may be embedded in documents using other technologies.

It should be appreciated that while computer memory module 30 and/or data service memory module 70 illustrated in FIGS. 2 and 4, respectively, have been described above as comprising computer storage media, the memory modules 30 and 70 should be broadly interpreted to cover communication media as well. Communication media may embody computer-readable instructions, data structures, program modules, or other data in a modulated data signal, such as a carrier wave or other transport mechanism, and may include any information delivery media. The term "modulated data signal" means a signal that has one or more of its characteristics set or changed in such a manner as to encode information in the signal. By way of example only, communication media may include wired media, such as a wired network or direct-wired connection, and wireless media, such as acoustic, RF, infrared, other wireless media, and combinations thereof.

In addition, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process the software by executing some software instructions at the local terminal and/or some at the remote computer (or network 80). Those skilled in the art will also realize that all or a portion of the software instructions may be carried out by a dedicated circuit, such as a DSP, programmable logic array, or the like.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. A method implemented at least in part by a computer processor and comprising:
    utilizing at least one first parameter associated with a context embedding interface to identify at least one transformation operation to perform on a portion of data associated with content, wherein the at least one transformation operation comprises transforming the portion of data from a first format to a second format by encoding the portion of data into a tag embeddable in the content; and
    utilizing at least one second parameter in the context embedding interface to identify one or more criteria for selecting the portion of data from one or more other portions of data using the at least one transformation operation identified via the at least one first parameter.

2. The method of claim 1, further comprising:
    utilizing at least one third parameter to return at least one portion of transformed data.

3. The method of claim 1, further comprising:
    performing the at least one transformation operation to provide the tag embedded in the content.

4. The method of claim 3, further comprising utilizing the at least one first parameter or another parameter to identify at least one other transformation operation, wherein the at least one other transformation operation comprises transforming the portion of data from the second format to the first format or another format by decoding the tag embedded in the content.

5. The method of claim 1, wherein the portion of data comprises at least one of confidential or personal data for which access is limited to at least one authorized person.

6. A system comprising:
    at least one transformation module configured to transform at least one portion of data describing related content from a first format to a second format, wherein the at least one portion of data is encoded as an embedded tag in the related content, and wherein to transform the at least one portion of data from the first format to the second format comprises decoding the embedded tag into the at least one portion of data, and wherein the at least one portion of data describes the related content and satisfies criteria associated with selecting the at least one portion of data; and
    at least one context module configured to provide a reference to the transformed at least one portion of data, wherein the reference is usable by at least one second authorized transformation module to transform the transformed at least one portion of data back into the first format.

7. The system of claim 6, further comprising:
    at least one context parameter that identifies the at least one portion of data.

8. A method for encoding with a tag module disposed on a computer, comprising:
    identifying, at a location and with a term recognizer, at least one portion of data that provides context information for content and that satisfies at least one criteria;
    transforming, with an information manipulation module, the at least one portion of data from a first format into a second format by encoding the at least one portion of data into a tag embeddable in the content; and
    embedding, with a tag action handler, the tag with the encoded at least one portion of into the content at the location.

9. The method as set forth in claim 8, further comprising:
    identifying other data that describes the at least one portion of data.

10. The method as set forth in claim 8, further comprising providing at least one reference to the transformed at least one portion of data at the location.

11. The method as set forth in claim 8, wherein the embedding comprises:
    providing a reference to an unencoded form of the at least one portion of data, wherein the reference is usable by an authorized user to access the transformed at least one portion of data in the embedded tag.

12. The method as set forth in claim 8, further comprising:
    calling a decoding method for decoding the transformed at least one portion of data encoded in the embedded tag at the location.

13. The method as set forth in claim 8, further comprising transforming, with the information manipulation module, the transformed at least one portion by decoding the transformed at least one portion of data.

14. The method as set forth in claim 8, wherein the transformed at least one portion of data comprises at least one of confidential or personal data for which access is limited to at least one authorized person.

15. The method as set forth in claim 8, wherein the transformed at least one portion describes one or more characteristics of the content.

* * * * *